United States Patent [19]
Fujitaka

[11] Patent Number: 5,544,534
[45] Date of Patent: Aug. 13, 1996

[54] ROTARY POWER TOOL

[75] Inventor: Junichi Fujitaka, Isehara, Japan

[73] Assignee: Ricoh Company, Ltd., Tokyo, Japan

[21] Appl. No.: 317,654

[22] Filed: Sep. 30, 1994

[30] Foreign Application Priority Data

Oct. 1, 1993 [JP] Japan .................................. 5-246653

[51] Int. Cl.⁶ .................................................... G01L 5/24
[52] U.S. Cl. ........................................ 73/862.23; 73/182
[58] Field of Search .......................... 73/862.21, 862.22, 73/862.23, 862.24, 862.338, 862.25; 81/470, 480; 173/182; 364/550, 551.01, 551.02

[56] References Cited

U.S. PATENT DOCUMENTS

| | | | |
|---|---|---|---|
| 2,682,796 | 7/1954 | Larson | 73/862.23 X |
| 3,710,874 | 1/1973 | Seccombe et al. | 173/182 |
| 4,281,538 | 8/1981 | Dudek | 173/182 X |
| 4,319,494 | 3/1982 | Marcinkiewicz | 73/862.23 |
| 4,402,052 | 8/1983 | Stone et al. | 73/862.25 X |
| 4,444,273 | 4/1984 | Ruby | 73/862.25 X |
| 4,446,745 | 5/1984 | Stone et al. | 73/862.25 |
| 4,730,254 | 3/1988 | Voden, Jr. | 73/862.25 X |
| 4,987,806 | 1/1991 | Lehnert | 173/182 X |
| 5,289,886 | 3/1994 | Shikata et al. | 173/182 X |
| 5,303,601 | 4/1994 | Schonberger et al. | 73/862.23 |
| 5,402,688 | 4/1995 | Okada et al. | 73/862.24 X |

FOREIGN PATENT DOCUMENTS

| | | |
|---|---|---|
| 2445457 | 6/1975 | Germany . |
| 50-60897 | 5/1975 | Japan . |
| 62-25980 | 6/1987 | Japan . |
| 2-25754 | 6/1990 | Japan . |
| 2-110480 | 9/1990 | Japan . |

*Primary Examiner*—Richard Chilcot
*Assistant Examiner*—Elizabeth L. Dougherty
*Attorney, Agent, or Firm*—Oblon, Spivak, McClelland, Maier & Neustadt, P.C.

[57] ABSTRACT

A rotary power tool having a device for detecting the torque of a rotatable shaft. The tool resets a peak torque of the shaft held therein in associated with fastening work. Hence, screws, for example, can be continuously driven without resorting to a switch or similar extra resetting means.

32 Claims, 8 Drawing Sheets

START SIGNAL

TIMER 27

PEAK SIGNAL

TIMER 43

PEAK RESET SIGNAL

TIME LIMIT SIGNAL

PEAK HOLD WAVEFORM ON DISPLAY

ROTARY POWER TOOL

BACKGROUND OF THE INVENTION

The present invention relates to a rotary power tool and, more particularly, to a rotary power tool having a device for detecting the torque of a rotatable shaft.

Assembling operations in general, e.g., driving screws into works is often implemented by an air driver, electric driver or similar rotary power tool in order to enhance efficiency. The problem wit this kind of tool is that the torque for driving, for example, a screw differs from one operator to anther operator. In light of this, there have recently been proposed rotary power tools provided with a torque detecting device for stabilizing the driving torque.

For example, Japanese Patent Laid-Open Publication No. 2-25754 (referred to as Prior Art 1 hereinafter) discloses a rotary power tool having an electric driver control circuit, a sample and hold circuit, a differential amplifier, a peak hold circuit, and a digital display. The electric driver control circuit outputs a reset signal when a reaction torque due to the start-up of a motor becomes zero. The sample and hold circuit takes in a torque output in response to the reset signal. The differential amplifier amplifies a difference in voltage between the two signals. The peak hold circuit holds a peak torque signal voltage represented by the output of the driver control circuit. The peak torque is displayed on the digital display. Japanese Utility Model Laid-Open Publication No. 2-110480 (referred to as Prior Art 2 hereinafter) teaches a rotary power tool including a torque load cell. The torque load cell is provided on the axis of the rear end of a drive section (body). The other end of the torque load cell is connected to the bottom of a tubular holder which rotatably supports the drive section (body) coaxially therewith. A torque detector detects a torque from the output of the load cell and displays it.

Prior Art 1 is effective if the tool starts rotating before the bit thereof mates with the recess of a screw. However, when the tool is held by hand to drive a screw, the reaction torque due to the start-up of the motor does not always become zero. In fact, the reaction torque, in many cases, does not become zero, as proved by actually recorded torque waveforms. For this reason, Prior Art 1 is not practical. In Prior Art 2, the torque detecting device is situated independently of the tool and holds the peak torque of the tool. This brings about a drawback that a reset switch for resetting the peak torque held has to be operated on the independent torque detector, increasing the number of assembling steps. In practice, even a delay of 0.1 second is critical when a great number of screws should be continuously driven into works.

SUMMARY OF THE INVENTION

It is, therefore, an object of the present invention to provide an efficient rotary power tool which resets the peak torque of a rotary shaft automatically in association with fastening work and thereby allows screws, for example, to be continuously driven into works without resorting to a switch or similar manual resetting means.

In accordance with the present invention, a rotary power tool comprises a rotatable shaft, a body supporting the shaft for outputting a drive force for driving it at one end thereof, a torque detecting device for detecting the torque of the shaft, a peak hold circuit for holding the peak torque of the shaft detected by the torque detecting device, and a peak hold cancelling circuit for resetting the peak torque held by the peak hold circuit by detecting at least one of the start and end of drive of the body.

Also, in accordance with the present invention, a rotary power tool comprises a rotatable shaft, a body supporting the shaft for outputting a drive, force for driving it at one end thereof, a torque detecting device for detecting the torque of the shaft, a peak hold circuit for holding the peak torque of the shaft detected by the torque detecting device, and a peak hold cancelling circuit for resetting the peak torque held by the peak hold circuit by detecting a predetermined torque of the shaft from the output signal of the torque detecting device.

DESCRIPTION OF THE PREFERRED EMBODIMENTS

Figure 1:
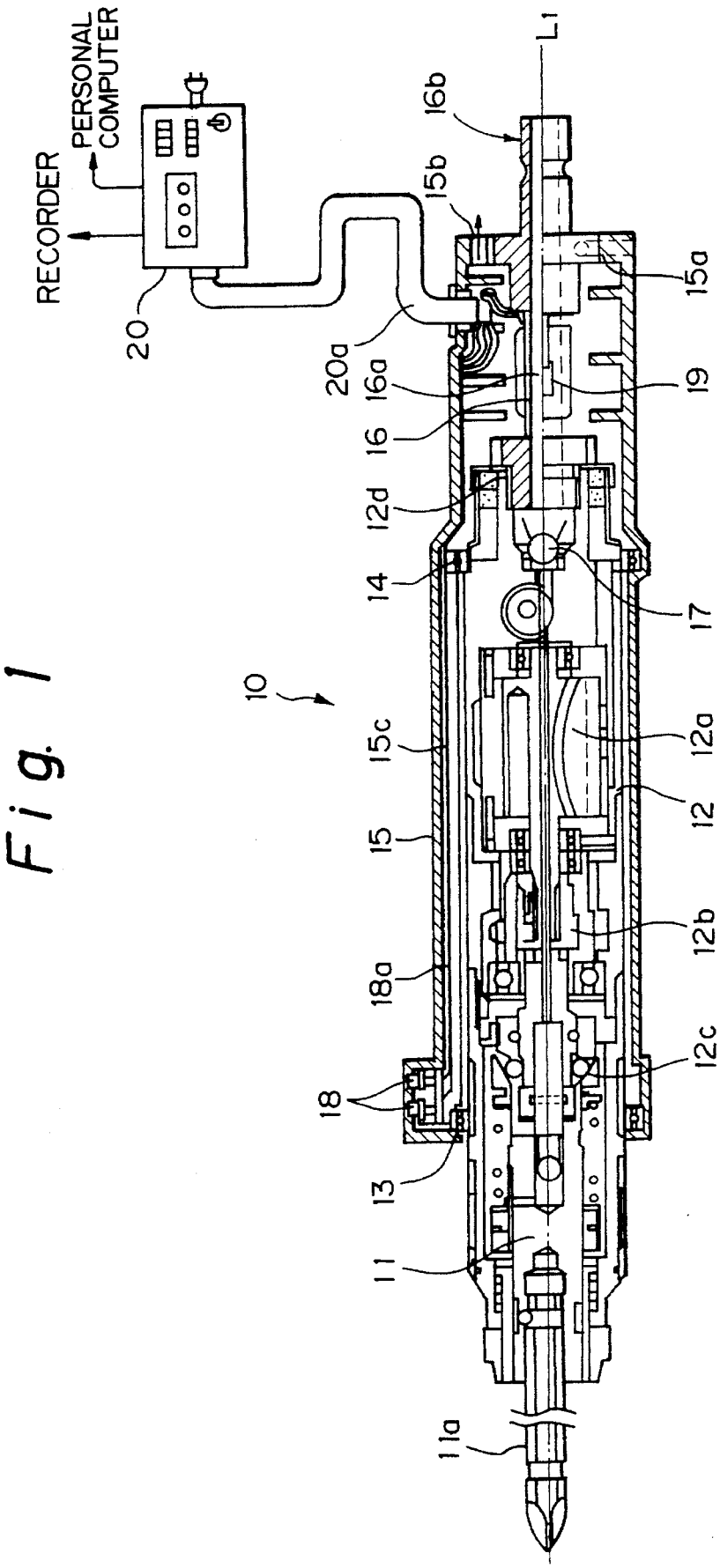
FIG. 1 is a section showing a rotary power tool embodying the present invention.
Figure 2:
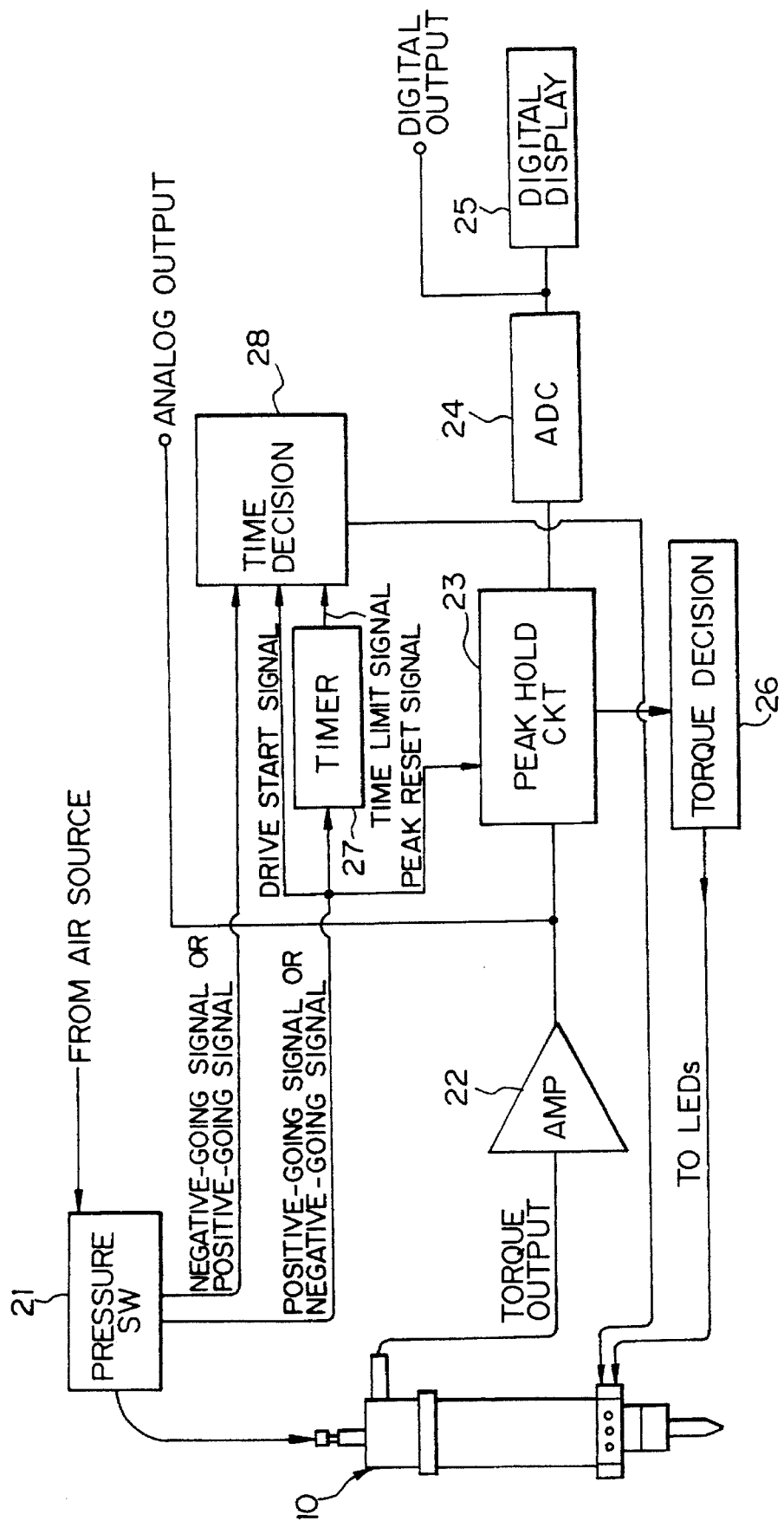
FIG. 2 is a block diagram schematically showing a control system included in the embodiment.
Figure 3:
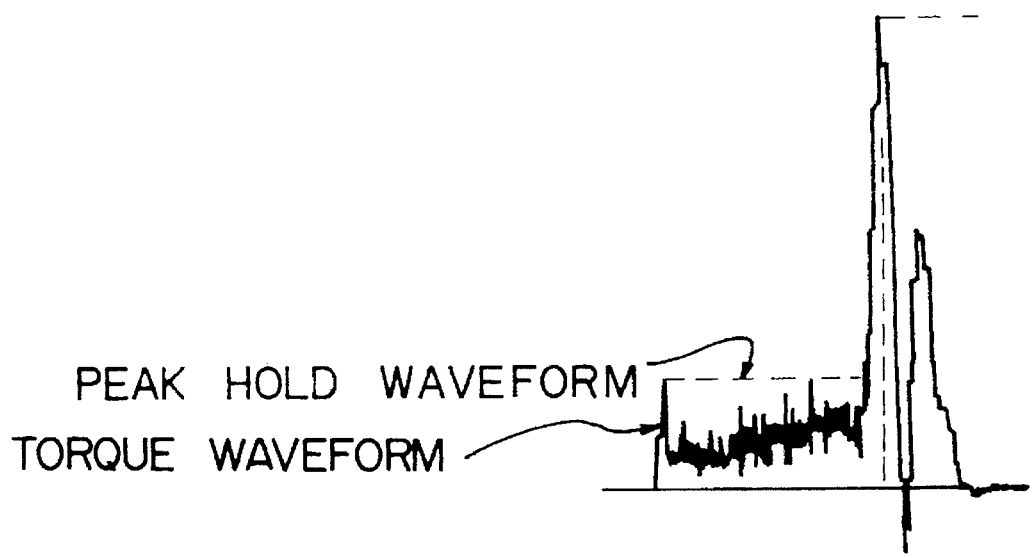
FIG. 3 shows a torque output waveform particular to the embodiment.
Figure 4:
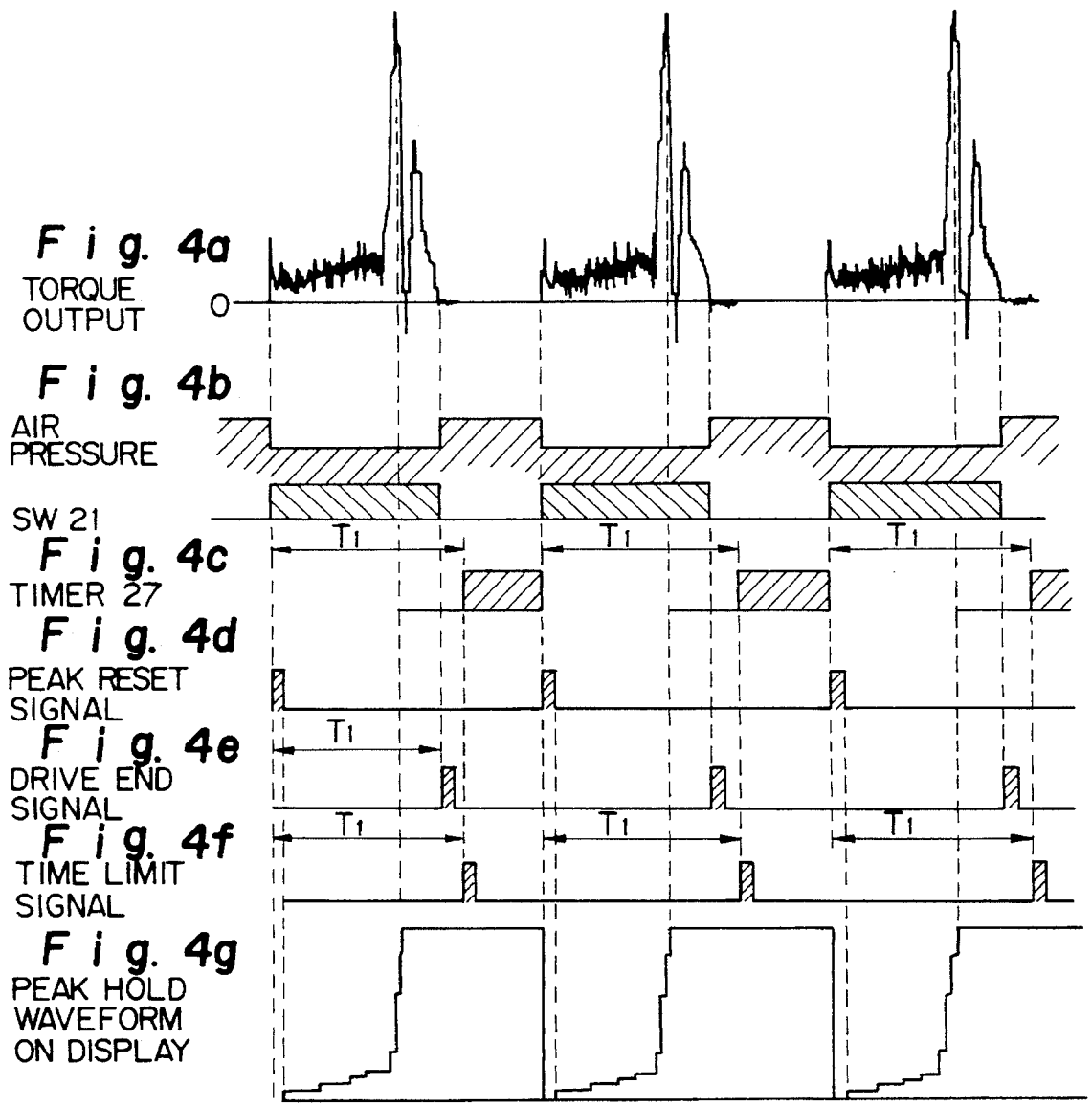
FIGS. 4a–4g are timing charts; demonstrating a specific operation of the embodiment.
Figure 5:
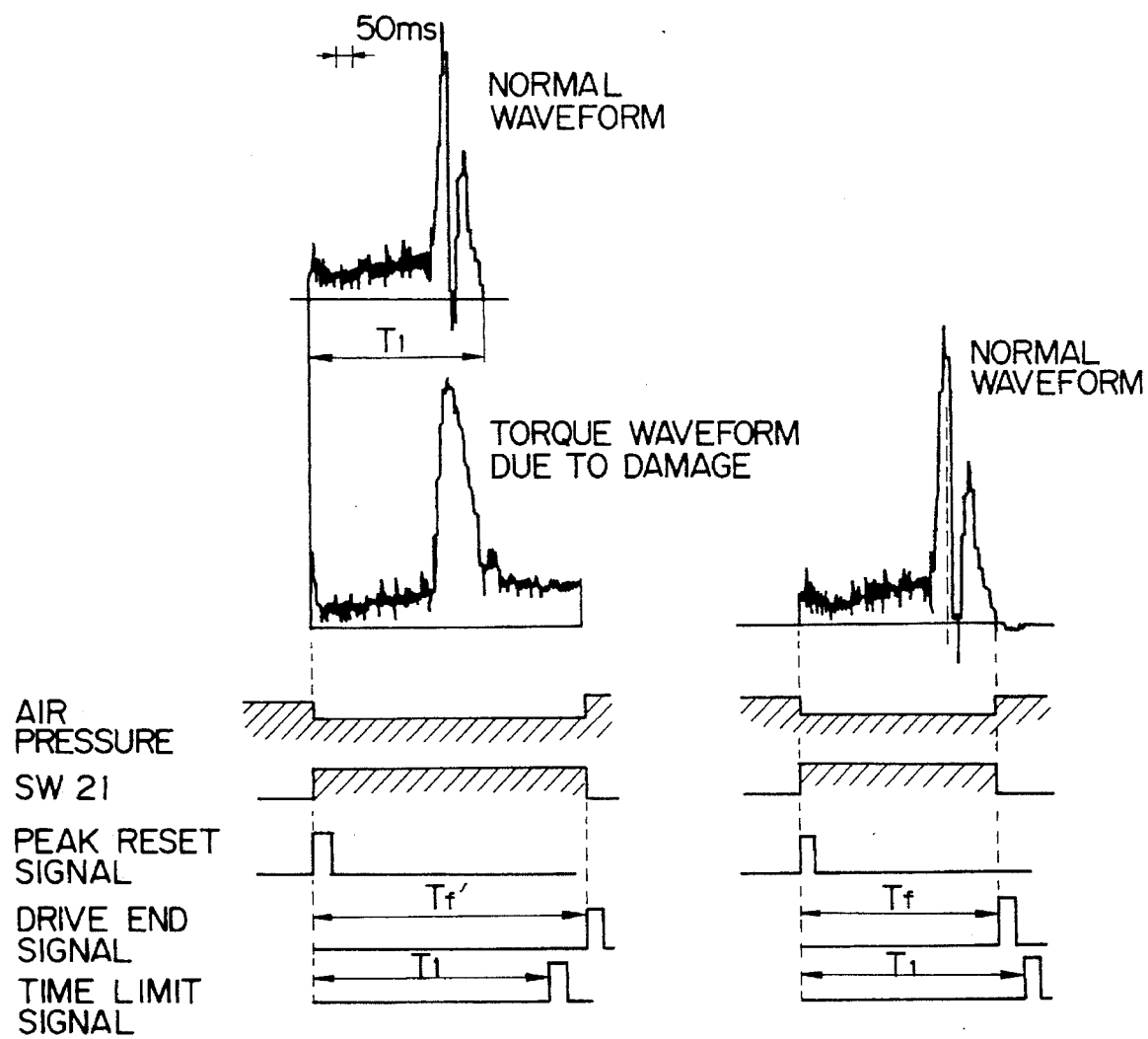
FIGS. 5A and 5B show torque output waveforms respectively indicating a faulty condition and a normal condition.

Referring to FIGS. 1, 2, 3, 4, 5A and 5B, a rotary power tool embodying the present invention is shown and implemented as an air driver by way of example. As shown in FIGS. 1 and 2, the air driver, generally 10, has a rotary output shaft 11 and a body 12. The output shaft 11 supports a bit 11a at the tip thereof. The body 12 accommodates an air motor 12a, a decelerator 12b, and an adjustable torque limiter 12c therein. The rotation of the air motor 12a is transmitted to the output shaft 11 via the decelerator 12b and torque limiter 12c, thereby rotating the bit 11a. As a result, the bit 11a drives, for example, a screw into a work. Specifically, a chuck is mounted on the tip of the output shaft 11 and supports the bit 11a. The body 12 is rotatably supported by a hollow cylindrical holder 15 via ball bearings 13 and 14.

A tubular elastic member 16 is located on the axis L1 of the output shaft 11. The tubular member, or simply tube as referred to hereinafter, 16 is fastened to the rear end 12d of the body 12 by screws at one end thereof and fastened to the bottom 15a of the holder 15 by pins, keys or similar means at the other end. The tube 16, therefore, connects the rear end 12d of the body 12 and the bottom 15a of the holder 15. A bore 16a extends throughout the tube 16a. A coupler 16b is formed integrally with the end of the tube 16 remote from the body 12 in order to introduce air under pressure into the bore 16a. Air under pressure from an air source (see FIG. 2) is fed to the air motor 12a via the coupler 16b, through bore 16a and a shut-off valve 17. The shut-off valve 17 is selectively opened or closed to set up or interrupt the the delivery of the air pressure to the air motor 12a. An aperture 15b is formed through the bottom 15a of the holder 15 for discharging air from the air motor 12a.

Indicators 18 are provided on the tip of the holder 15 and implemented as, for example, blue, red and other LEDs (Light Emitting Diodes). A strain gauge 19 is affixed to the elastic tube 16 by adhesive. The indicators 18 and strain gauge 19 are electrically connected to a torque detecting device 20 by a signal line 20a. The strain gauge 19 changes the resistance thereof in response to torsional displacement of the tube 16. The torque detecting device 20 detects the change in the resistance of the strain gauge 19 in terms of a potential difference with a bridge circuit built therein, not shown, and turns on one of the indicators 18 matching the potential difference. In this sense, the tube 16 and strain gauge 19 play the role o f torque sensing means combination. An electric wire 18a is received in a recess 15a formed in the inner wall of the holder 15 and connects the indicators 18 to the signal line 20a.

The torque detecting device 20, implemented by a display or an alarm by way of example, determines instantly whether or not a potential difference due to a change in the resistance of the strain gauge 19 corresponds to a torque lying in a predetermined range. If the potential difference corresponds to such a torque, the device 20 sends an OK signal to the indicators 18 via the signal line 20a and wire 18a. If the former does not correspond to the latter, the device 20 sends an NG (No Good) signal to the indicators 18 via the same route as the OK signal. The OK signal and the NG signal respectively turn on, for example, a blue LED and a red LED, informing the operator of the respective conditions. The unit 20 may be provided with a buzzer, if desired.

The torque detecting device 20 delivers the compressed air from the air source to the air motor 12a via a pressure switch (SW) 21. The air pressure of the air source slightly changes when the air driver 10 begins to be driven. The device 20, based on such a phenomenon, receives an ON signal and an OFF signal from the pressure SW 21 as a drive start signal and a drive end signal, respectively.

The torque detecting device 20 has an amplifier 22 (AMP) for amplifying the potential difference (torque output) derived from a change in the resistance of the strain gauge 19. A peak hold circuit, or peak holding means, 23 holds a peak torque appeared in the torque output amplified by the AMP 22 (see FIG. 3). An analog-to-digital converter (ADC) 24 digitizes the peak torque held by the peak hold circuit 23. A digital display 25 displays the output of the ADC 24. A torque decision unit 26 determines whether or not the peak torque held by the circuit 23 lies in a predetermined range. The decision unit 26 turns on the blue LED, included in the indicators 18, if the answer of this decision is positive or turns on the red LED if otherwise. A timer 27 and a time decision unit 28 receive, at the same time as the peak hold circuit 23, the ON signal or the OFF signal from the pressure SW 21 in order to see if the drive time of the air driver 10 lies in a predetermined range. The output of the AMP 22 is connected to an exclusive terminal to be output as analog data. Also, the output of the ADC 24 is connected to an exclusive terminal to be output as digital data. The analog data and the digital data may be sent to a recorder and a computer, respectively.

When the air pressure falls as determined by the pressure SW 21, the peak hold circuit 23 receives the resulting positive-going signal from the pressure SW 21 as a peak reset signal. In response, the peak hold circuit 23 releases the potential of a capacitor, not shown, to ground for thereby resetting the peak torque held therein. The pressure SW 21, therefore, plays the role of peak hold cancelling means. The timer 27 receives the signal from the pressure SW 21 as a drive start signal and, on the elapse of a predetermined period of time $(T_1)$, delivers a time limit signal to the time decision unit 28. The time decision unit 28 receives the signals (drive start signal and drive end signal) from the pressure SW 21 as well as the time limit signal from the timer 27. If the time interval $T_f$ between the drive start signal and the drive end signal, i.e., the drive time lies in a predetermined range $(T_1)$, the time decision unit 28 turns on a green LED included in the indicators 18. If the former does not lie in the preselected range, the unit 28 turns on a yellow LED also included in the indicators 18. The range of drive time, i.e., the delay time $T_1$ derived from the timer 27 is determined by dividing the length of a screw by a pitch to produce a required total number of turns, dividing the total number of turns by the rotation speed of the air driver 10, multiplying the resulting quotient by 60 seconds, and then adding some margin to the resulting product.

In operation, the operator mates the bit 11a of the air driver 10 with a screw, not shown, and holds the holder 15. In this condition, as air under pressure is fed to the air motor 12a, the motor 12a causes the bit 11a to rotate together with the output shaft 11. When the air driver 10 begins to be driven, the air pressure slightly falls, as shown in FIG. 4b. The resulting positive-going signal from the pressure SW 21 is fed to the timer 27 and time decision unit 28 as a drive start signal and ted to the peak hold circuit 23 as a peak reset signal. As a result, the peak torque held by the peak hold circuit 23 is cancelled or reset.

As the bit 11a in rotation sequentially drives the screw into a work, the drive torque increases with the result that the elastic tube 16 is distorted by a reaction proportional to the drive torque. The distortion of the tube 16 is sensed by the strain gauge 19. The torque output sensed by the tube 16 and strain gauge 19 is amplified by the AMP 22 to a predetermined size and then applied to the peak hold circuit 23. The peak hold circuit 23 holds a peak torque appeared in the input torque output. At the same time, the ADC 24 digitizes the torque output and applies the output thereof to the digital display 25.

The peak torque is transferred from the peak hold circuit 23 to the torque decision unit 26. In response, the decision unit 26 determines whether or not the peak torque lies in the predetermined range and, if the answer is positive, turns on the blue LED included in the indicators 18. When the peak torque reaches a predetermined torque, the torque limiter 12c is automatically operated to interrupt rotation of the output shaft 11. At the same time, the shut-off valve 17 is closed to stop the air supply to the air motor 12a, i.e., the operation of the motor 12a. Consequently, the air source regains the original air pressure thereof. The resulting negative-going signal from the pressure SW 21 is fed to the time decision unit 28 as a drive end signal. Subsequently, the previously mentioned drive limit signal, delayed by T1 seconds by the timer 27, is applied to the decision unit 28. The decision unit 28 compares the time interval $T_f$ (second) between the drive start signal and the drive end signal and the delay time $T_1$ (second) due to the timer 27. If $T_f$ is shorter than $T_1$, the decision unit 28 determines that the drive time is adequate and turns on the green LED included in the indicators 18.

The operator, therefore, can see instantly if the drive torque, which is one of the factors determining the quality of the work, was adequate and if the drive time was adequate, watching the indicators 18 provided on the air driver 10.

Assume that the threads of a female screw or those of a male screw are damaged while being driven by the air driver 10 into a work. Then, the torque changes as shown in FIG. 5A, which is contrastive to FIG. 5B indicative of a normal torque variation. However, since the peak torque is smaller than the predetermined torque of the torque limiter 12c, the torque limiter 12c does not operate. This, coupled with the fact that the shut-off valve 17 does not operate, prevents the air driver 10 from stopping automatically. The torque decision unit 26 determines that the peak torque, which is lower than the predetermined torque, does not lie in the preselected range. As a result, the decision unit 26 turns on the red LED included in the indicators 18, thereby informing the operator of the damage. The operator can see the peak torque appearing on the digital display 25.

Further, since the delivery of air under pressure to the air driver 10 is not interrupted, i.e., the air source does not restore the original pressure thereof, the pressure switch SW 21 does not output a negative-going signal or a positive-going edge signal. However, since the drive end signal $T'_f$ does not appear within the delay time $T_1$, as shown in FIG. 5A, the time decision unit 28 determines that the time interval $T'_f$ is longer than the time interval $T_1$ and turns on the yellow LED included in the indicators 18. This also alerts the operator to the damage of the screw. The embodiment, which is not of an automatic shut-off type, allows the operator to recognize the above condition simply as "unusual torque".

As stated above, the embodiment allows the operator to see instantly if the driving torque was adequate and if the screw was damaged by watching the indicators 18. In addition, the operator can confirm the peak torque appearing on the digital display 25.

When the peak torque reaches the predetermined torque, the torque limiter 12c interrupts the transmission of the rotation to the output shaft 11 while the shut-off valve 17 interrupts the operation of the air motor 12a. In response to the resulting change in air pressure, the peak hold circuit 23 resets the peak torque held therein. This eliminates the need for a reset switch or similar extra resetting means and, in addition, allows the operator to drive screws continuously without operating such resetting means.

In the illustrative embodiment, the elastic tube 16 for sensing torque is located at the side opposite to the rotation output side and, therefore, does not affect the operation of the torque limiter 12c which is located at the rotation output side. Since compressed air is passed through the bore 16a of the tube 16, the air driver 10 is reduced in size. Furthermore, the tube 16 has opposite ends thereof affixed to the bottom 15a of the holder 15 and the end 12d of the body 12 which face each other. Hence, the tube 16 is free from bending stresses and, therefore, allows a minimum of error to be introduced in the detection of the driving torque.

Assume that the torque output from the torque detecting device 20 is sent to a recorder or a personal computer, as mentioned earlier. Then, by observing the torque waveform from the beginning to the end of driving of a screw, it is possible to evaluate, for example, the drive characteristic of a tapping screw. Also, it is possible to store the torque screw by screw for a management purpose. If desired, the strain gauge 19 responsive to the distortion of the tube 16 may be replaced with a magnet and a coil affixed to opposite ends of the tube 16. Such an alternative implementation will detect the distortion of the tube 16 in terms of a change in induction current, using the fact that the electric lines of force change in response to a stress. Further, use may be made of an elastic member having a cam-like or similar particular cross-section; the distortion of the elastic member will be determined in terms of a difference in radial distance between the holder 15 and the elastic member by a semiconductor laser.

While the embodiment resets the peak torque in response to a drive start signal, it may, of course, be reset by a drive end signal if a timer is used.

Figure 6:
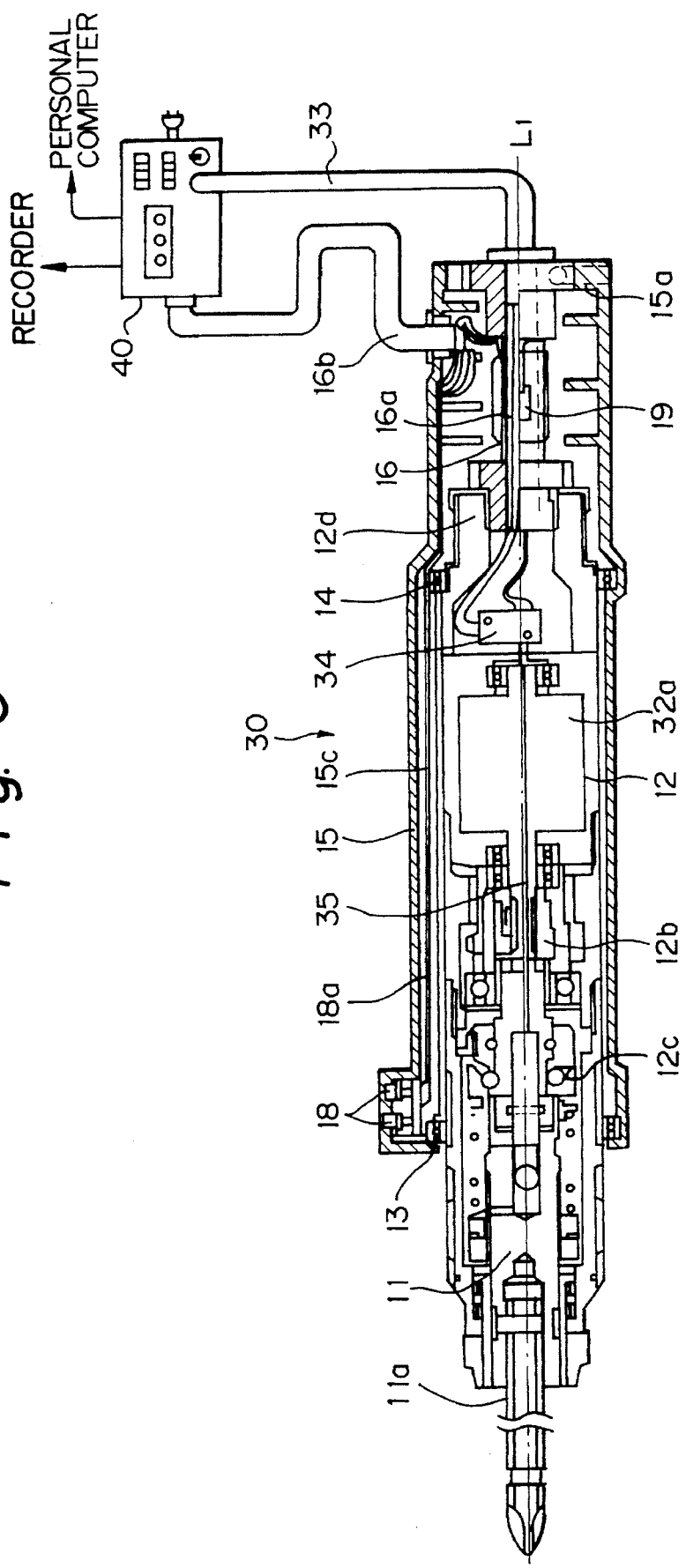
FIG. 6 is a section showing an alternative embodiment of the present invention.
Figure 7:
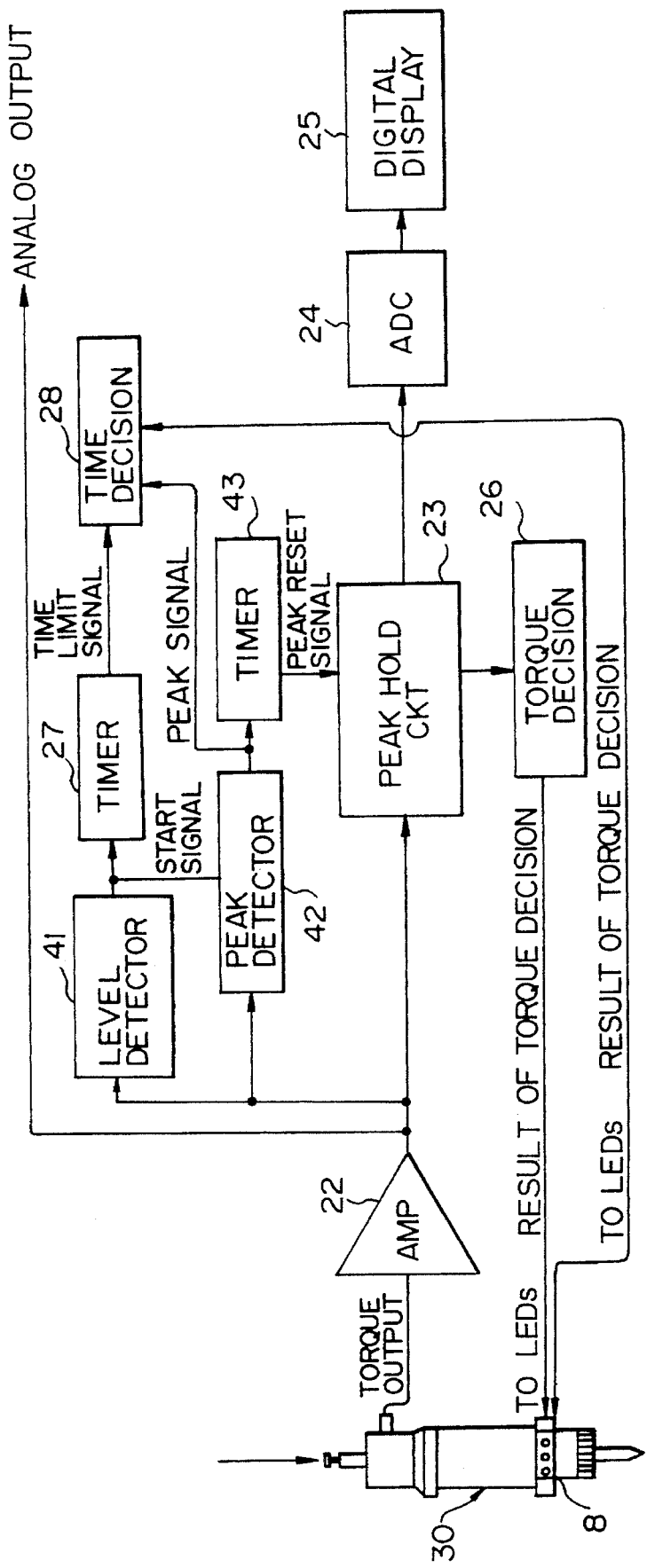
FIG. 7 is a block diagram schematically showing a control system included in the alternative embodiment.

Referring to FIGS. 6, 7 and 8, an alternative embodiment of the present invention will be described which is implemented as an electric driver. In the figures, the same or similar constituent parts as or to the parts shown in FIGS. 1–5B are designated by the same reference numerals, and a detailed description thereof will not be made in order to avoid redundancy.

As shown in FIGS. 6 and 7, the electric driver, generally 30, has the body 12 accommodating an electric motor 32a. The rotation of the motor 32a is transmitted to the output shaft 11 via the decelerator 12b and torque limiter 12c. The output shaft 11 rotates the bit 11a for thereby driving, for example, a screw into a work. A motor control circuit, not shown, is built in a torque detecting device 40 and sends a motor control current to the motor 32a via an electric wire 33 and a start switch (SW) 34. The wire 33 is received in the bore 16a of the elastic tube 16. When the operator holds the holder 15, mates the recess of a screw with the tip of the bit 11a, and then presses the bit 11a against a female-threaded hole, the output shaft 11 is urged a predetermined distance backward until it presses a start shaft 35. As a result, the start shaft 35 turns on the start SW 34. Of course, the wire 33 does not have to be passed through the bore 16a of the elastic tube 16.

In the torque detecting device 40, a level detector 41 receives the amplified torque output from the AMP 22. when the amplified torque output, i.e., voltage exceeds a preselected start level. $V_l$ (corresponding to a torque of, for example, 1 kg to 2 kg f-cm), the level detector 41 outputs it as a drive start signal. A peak detector 42 starts detecting the torque output of the AMP 22 on receiving the drive start signal from the level detector 41. When the torque output becomes 0 V (or start level $V_1$, if desired), the peak detector 42 determines that the driving torque has reached a peak torque (see FIG. 8) and outputs a peak signal (drive end signal). A timer, or peak hold cancelling means, 43 starts counting time on receiving the peak signal from the peak detector 42. On the elapse of $T_2$ second necessary for the operator to see the indicators 18, the timer 43 feeds a peak reset signal to the peak hold circuit 23, thereby resetting the peak torque existing in the circuit 23.

Figure 8A:
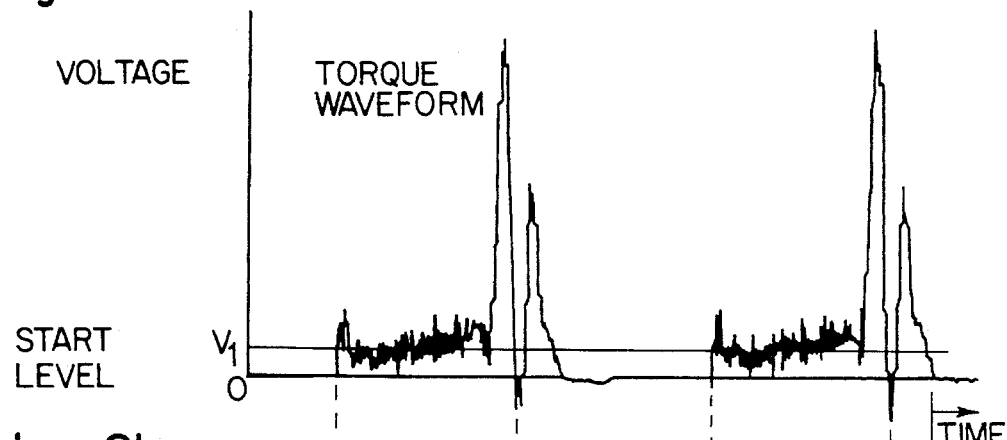
FIGS. 8a–8h are timing charts representing a specific operation of the alternative embodiment.
Figure 8B:
Figure 8C:
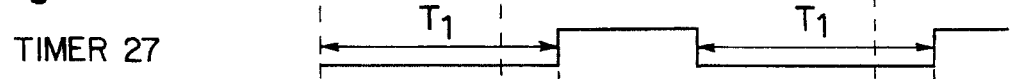
Figure 8D:
Figure 8E:
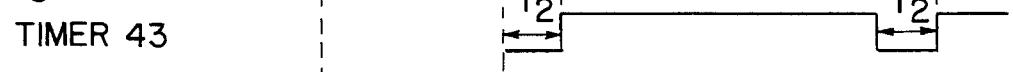
Figure 8F:
Figure 8G:
Figure 8H:
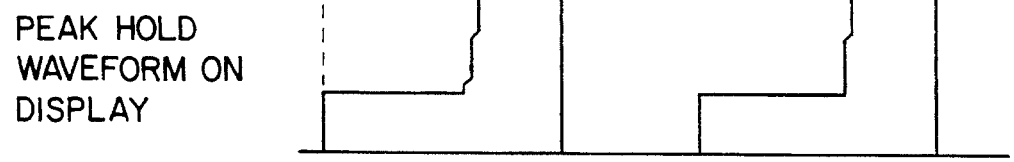

In operation, when the previously mentioned motor control current is fed to the motor 32a, the bit 11a is rotated together with the output shaft 11 to drive the screw into a work with the result that the driving torque sequentially increases. The resulting torque output is sensed by the elastic tube 16 and strain gauge 19 and then amplified by the AMP 22. When the output torque exceeds the start level V1, as shown in FIG. 8a, the level detector 41 delivers a drive start signal to the timer 27 and peak detector 42. In response, the timer 27 starts counting time while the peak detector 42 starts detecting the amplified torque output from the AMP 22. The peak hold circuit 23 holds a peak torque appeared in the torque output. The ADC 24 digitizes the peak torque and causes the resulting data to appear on the digital display 25.

On receiving the peak torque from the peak hold circuit 23, the torque decision unit 26 determines whether or not it lies in the predetermined range. The decision unit 26 turns on the blue LED if the former lies in the latter or turns on the red LED if otherwise.

When the peak detector 42 detects a zero torque (0 V) after the peak torque, it feeds a peak signal to the timer 43 and time decision unit 28. The decision unit 28 determines whether or not the peak signal has been input before the arrival of a time limit signal from the timer 27, i.e., before the elapse of the time limit $T_l$. If the peak signal has been input within the period of time $T_1$, the decision unit 28 turns on the green LED included in the indicators 18; if otherwise, the decision unit 28 turns on the yellow LED. In response to the peak signal, the timer 43 starts counting time. On the elapse of $T_2$ second, the timer 43 feeds a peak reset signal to the peak hold circuit 23 so as to reset the peak torque held therein.

As stated above, this embodiment also allows the operator to see instantly if the drive torque was adequate and if the drive time was adequate by watching the indicators 18. In addition, the operator can drive screws continuously without operating a switch or similar extra resetting means.

In summary, it will be seen that the present invention provides a rotary power tool which automatically resets a peak torque held therein at predetermined timing in association with fastening work. Hence, the tool allows the operator to continue the work without operating a switch or similar resetting means, thereby enhancing efficient work.

Various modifications will become possible for those skilled in the art after receiving the teachings of the present disclosure without departing from the scope thereof.

What is claimed is:

1. A rotary power tool comprising:
   a rotatable shaft;
   a body supporting said shaft for providing a drive force for driving said shaft;
   torque detecting means for detecting a torque in said shaft;
   peak holding means for holding a peak torque, which said peak torque has been detected by said torque detecting means; and
   peak hold cancelling means for resetting the peak torque held by said peak holding means in response to a detection of at least one of a start and an end of a drive force of said body.

2. A rotary power tool comprising:
   a rotatable shaft;
   a body supporting said shaft for providing a drive force for driving said shaft;
   torque detecting means for detecting a torque in said shaft;
   peak holding means for holding a peak torque, which said peak torque has been detected by said torque detecting means; and
   peak hold cancelling means for resetting the peak torque held by said peak holding means in response to an output signal of said torque detecting means indicating that the peak torque has reached a predetermined value.

3. A rotary power tool as recited in claim 1, further including torque sensing means comprising a tubular member connected to said body and a strain gauge disposed on said tubular body.

4. A rotary power tool as recited in claim 1, wherein said peak holding means comprises a peak holding circuit.

5. A rotary power tool as recited in claim 1, further including an air driver, and wherein said peak hold cancelling means detects a drop in air pressure to detect starting of a drive operation by said air driver for resetting the peak torque.

6. A rotary power tool as recited in claim 1, further including a torque limiter which interrupts rotation of said shaft when the peak torque exceeds a predetermined torque.

7. A rotary power tool as recited in claim 1, further including a display which displays the peak torque.

8. A rotary power tool as recited in claim 1, further including a decision unit which determines when the peak torque is lower than a preselected value.

9. A rotary power tool as recited in claim 8, further including an indicator light, and wherein said decision unit turns on the indicator light in response to a determination that the peak torque is less than said preselected value.

10. A rotary power tool as recited in claim 1, further including a decision unit for determining whether said peak torque is within a predetermined range.

11. A rotary power tool as recited in claim 10, further including indicator means for indicating when the peak torque is within said predetermined range as determined by said decision unit.

12. A rotary power tool as recited in claim 1, further including means for determining a drive time of said rotatable shaft, and a time decision unit for determining whether said drive time is within a predetermined time range.

13. A rotary power tool as recited in claim 12, further including indicator means for indicating whether said drive time is within said predetermined time range as determined by said time decision unit.

14. A rotary power tool as recited in claim 1, further including an air driver, and wherein said peak hold cancelling means detects a change in air pressure to detect an end of a drive operation by said air driver for resetting the peak torque.

15. A power tool as recited in claim 1, further including means for providing a drive start signal.

16. A power tool as recited in claim 15, further including an electric motor for providing a drive force to said body.

17. A power tool as recited in claim 1, further including means for providing a drive end signal.

18. A rotary power tool as recited in claim 2, wherein said peak hold cancelling means includes a timer which outputs a peak torque reset signal after: (1) receiving a peak signal indicating that the peak torque has reach said predetermined value, and (2) a predetermined time has elapsed following receiving of said peak signal.

19. A rotary power tool as recited in claim 2, further including torque sensing means comprising a tubular member connected to said body and a strain gauge disposed on said tubular body.

20. A rotary power tool as recited in claim 2, wherein said peak holding means comprises a peak holding circuit.

21. A rotary power tool as recited in claim 2, further including an air driver, and wherein said peak hold cancelling means detects a drop in air pressure to detect starting of a drive operation by said air driver for resetting the peak torque.

22. A rotary power tool as recited in claim 2, further including a torque limiter which interrupts rotation of said shaft when the peak torque exceeds a predetermined torque.

23. A rotary power tool as recited in claim 2, further including a display which displays the peak torque.

24. A rotary power tool as recited in claim 2, further including a decision unit which determines when the peak torque is lower than a preselected value.

25. A rotary power tool as recited in claim 24, further including an indicator light, and wherein said decision unit turns on the indicator light in response to a determination that the peak torque is less than said preselected value.

26. A rotary power tool as recited in claim 2, further including a decision unit for determining whether said peak torque is within a predetermined range.

27. A rotary power tool as recited in claim 26, further including indicator means for indicating when the peak torque is within said predetermined range as determined by said decision unit.

28. A rotary power tool as recited in claim 2, further including means for determining a drive time of said rotatable shaft, and a time decision unit for determining whether said drive time is within a predetermined time range.

29. A rotary power tool as recited in claim 28, further including indicator means for indicating whether said drive time is within said predetermined time range as determined by said time decision unit.

30. A rotary power tool as recited in claim 2, further including an air driver, and wherein said peak hold cancelling means detects a change in air pressure to detect an end of a drive operation by said air driver for resetting the peak torque.

31. A power tool as recited in claim 2, further including means for providing a drive start signal.

32. A power tool as recited in claim 2, further including an electric motor for providing a drive force to said body.

* * * * *